United States Patent
Fan

(10) Patent No.: US 12,302,283 B2
(45) Date of Patent: May 13, 2025

(54) METHOD AND NETWORK NODE FOR PAGING

(71) Applicant: Telefonaktiebolaget LM Ericsson (publ), Stockholm (SE)

(72) Inventor: Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 475 days.

(21) Appl. No.: 17/641,177

(22) PCT Filed: Sep. 11, 2019

(86) PCT No.: PCT/CN2019/105429
§ 371 (c)(1),
(2) Date: Mar. 8, 2022

(87) PCT Pub. No.: WO2021/046766
PCT Pub. Date: Mar. 18, 2021

(65) Prior Publication Data
US 2022/0346059 A1     Oct. 27, 2022

(51) Int. Cl.
*H04W 68/00* (2009.01)
*H04L 1/00* (2006.01)
*H04W 76/28* (2018.01)

(52) U.S. Cl.
CPC ......... *H04W 68/005* (2013.01); *H04L 1/0015* (2013.01); *H04W 76/28* (2018.02)

(58) Field of Classification Search
CPC .. H04W 68/005; H04W 76/28; H04L 1/0015; H04L 1/08
(Continued)

(56) References Cited

U.S. PATENT DOCUMENTS

2011/0201361 A1* 8/2011 Montojo ............... H04L 5/0091
                                                  455/458
2018/0242277 A1* 8/2018 Liu ........................ H04W 8/005
(Continued)

FOREIGN PATENT DOCUMENTS

| CN | 108353381 A | 7/2018 |
|---|---|---|
| WO | 2017134561 A1 | 8/2017 |

(Continued)

OTHER PUBLICATIONS

Extended European Search Report for European Patent Application No. 19945052.9, mailed Apr. 20, 2023, 16 pages.
(Continued)

*Primary Examiner* — Rownak Islam
(74) *Attorney, Agent, or Firm* — Sage Patent Group

(57) ABSTRACT

A method and a network node for paging are disclosed. According to an embodiment, the network node determines, for current paging occasion (PO), a reference terminal device that has the worst radio link quality among one or more terminal devices needed to be paged at the current PO or a subsequent PO in current paging time window (PTW). The network node determines, from multiple terminal devices needed to be paged in the current PTW, one or more target terminal devices to be paged at the current PO together with the reference terminal device, based at least on radio link qualities of the multiple terminal devices. The network node pages the one or more target terminal devices and the reference terminal device at the current PO, using link adaptation based on the reference terminal device.

14 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0185613 A1* | 6/2021 | Kalhan | ................. H04W 76/11 |
| 2021/0306953 A1* | 9/2021 | Hwang | ............. H04W 52/0235 |
| 2022/0225270 A1* | 7/2022 | Wigard | ............. H04W 52/0229 |
| 2023/0164743 A1* | 5/2023 | Radulescu | ............ H04W 68/00 |
| | | | 370/329 |

FOREIGN PATENT DOCUMENTS

| | | | |
|---|---|---|---|
| WO | 2018156269 A1 | 8/2018 | |
| WO | 2019095323 A1 | 5/2019 | |

OTHER PUBLICATIONS

Author Unknown, "Technical Specification Group Radio Access Network; Evolved Universal Terrestrial Radio Access (E-UTRA); User Equipment (UE) procedures in idle mode (Release 15)," Technical Specification 36.304, Version 15.4.0, Jun. 2019, 3GPP Organizational Partners, 55 pages.
Mediatek Inc., "R1-1805996: Wake Up Signal Configuration for Nb-Iot," 3GPP TSG RAN WG1 Meeting #93, May 21-25, 2018, Busan, South Korea, 6 pages.
International Search Report and Written Opinion for International Patent Application No. PCT/CN2019/105429, mailed May 28, 2020, 9 pages.

\* cited by examiner

METHOD AND NETWORK NODE FOR PAGING

This application is a 35 U.S.C. § 371 national phase filing of International Application No. PCT/CN2019/105429, filed Sep. 11, 2019, the disclosure of which is incorporated herein by reference in its entirety.

TECHNICAL FIELD

Embodiments of the disclosure generally relate to communication, and, more particularly, to a method and a network node for paging.

BACKGROUND

This section introduces aspects that may facilitate better understanding of the present disclosure. Accordingly, the statements of this section are to be read in this light and are not to be understood as admissions about what is in the prior art or what is not in the prior art.

As legacy long term evolution (LTE), narrow-band Internet of things (NB-IoT) user equipment (UE) in idle mode operation needs to monitor paging. In every paging cycle, the UE wakes up in its designated time window to check whether there is a paging message or not. A paging cycle may be configured as discontinuous reception (DRX) or extended DRX (eDRX) cycle. The maximum DRX and eDRX cycles are 10.24 seconds and two hours, 54 minutes and 46 seconds, respectively. A paging message is carried in narrow-band physical downlink shared channel (NPDSCH) and scheduled by downlink control information (DCI) format N2 carried in narrow-band physical downlink control channel (NPDCCH).

The frame/subframe at which UE needs to listen to paging message is according to some rules. For DRX, the paging frame (PF) is calculated as:

$$\text{SFN mod } T = (T \text{ div } N) * (\text{UE\_ID mod } N),$$

where SFN is the system frame number of the PF, T is the DRX cycle of the UE, N=min(T,nB), and UE_ID=IMSI mod 1024. The parameter nB can have values of 4T, 2T, T, T/2, T/4, T/8, T/16, T/32, T/64, T/128, and T/256, and for NB-IoT also T/512, and T/1024. Min( ) refers to the function for returning the minimum value from the input parameters. IMSI is the international mobile subscriber identity of the UE.

For DRX, paging occasion (PO) is obtained by a look-up table using index i_s which is calculated as:

$$i\_s = \text{floor}\left(\frac{\text{UE\_ID}}{N}\right) \text{mod } N_s,$$

where floor( ) refers to the function for returning the largest possible integer value which is less than or equal to the input parameter, $N_s$=max(1,nB/T), and max( ) refers to the function for returning the maximum value from the input parameters. For frequency division duplexing (FDD), the table is as below. More details can be obtained from 3rd generation partnership project (3GPP) technical specification (TS) 36.304 V15.4.0.

| Ns | PO when i_s = 0 | PO when i_s = 1 | PO when i_s = 2 | PO when i_s = 3 |
| --- | --- | --- | --- | --- |
| 1 | 9 | N/A | N/A | N/A |
| 2 | 4 | 9 | N/A | N/A |
| 4 | 0 | 4 | 5 | 9 |

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for paging.

According to a first aspect of the disclosure, there is provided a method performed by a network node. The method may comprise determining, for current paging occasion (PO) a reference terminal device that has the worst radio link quality among one or more terminal devices needed to be paged at the current PO or a subsequent PO in current paging time window (PTW). The method may further comprise determining, from multiple terminal devices needed to be paged in the current PTW, one or more target terminal devices to be paged at the current PO together with the reference terminal device, based at least on radio link qualities of the multiple terminal devices. The method may further comprise paging the one or more target terminal devices and the reference terminal device at the current PO, using link adaptation based on the reference terminal device.

In this way, the repetition number of the paging message required for paging can be reduced to save the resource for paging.

In an embodiment of the disclosure, the one or more target terminal devices may be determined based further on last POs of the multiple terminal devices.

In an embodiment of the disclosure, the determined one or more target terminal devices may comprise at least one first terminal device that has a similar radio link quality as the reference terminal device.

In an embodiment of the disclosure, the determined one or more target terminal devices may comprise at least one second terminal device whose radio link quality is better than the reference terminal device and for which a last PO is next PO. The next PO is also the last PO of a third terminal device having a similar or worse radio link quality than the reference terminal device.

In an embodiment of the disclosure, the determined one or more target terminal devices may comprise at least one fourth terminal device for which a last PO is the current PO.

In an embodiment of the disclosure, the radio link quality of a terminal device may be represented by a coverage enhancement (CE) level of the terminal device.

In an embodiment of the disclosure, the multiple terminal devices may operate in extended discontinuous reception (eDRX) mode.

According to a second aspect of the disclosure, there is provided a network node. The network node may comprise at least one processor and at least one memory. The at least one memory may contain instructions executable by the at least one processor, whereby the network node may be operative to determine, for current PO, a reference terminal device that has the worst radio link quality among one or more terminal devices needed to be paged at the current PO or a subsequent PO in current PTW. The network node may be further operative to determine, from multiple terminal devices needed to be paged in the current PTW, one or more target terminal devices to be paged at the current PO together with the reference terminal device, based at least on radio link qualities of the multiple terminal devices. The network node may be further operative to page the one or more target terminal devices and the reference terminal device at the current PO, using link adaptation based on the reference terminal device.

In an embodiment of the disclosure, the instructions may be executable by the at least one processor, whereby the network node may be operative to determine the one or more target terminal devices based further on last POs of the multiple terminal devices.

In an embodiment of the disclosure, the determined one or more target terminal devices may comprise at least one first terminal device that has a similar radio link quality as the reference terminal device.

In an embodiment of the disclosure, the determined one or more target terminal devices may comprise at least one second terminal device whose radio link quality is better than the reference terminal device and for which a last PO is next PO. The next PO is also the last PO of a third terminal device having a similar or worse radio link quality than the reference terminal device.

In an embodiment of the disclosure, the determined one or more target terminal devices may comprise at least one fourth terminal device for which a last PO is the current PO.

In an embodiment of the disclosure, the radio link quality of a terminal device may be represented by a CE level of the terminal device.

In an embodiment of the disclosure, the multiple terminal devices operate in eDRX mode.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided a network node. The network node may comprise a first determination module for determining, for current PO, a reference terminal device that has the worst radio link quality among one or more terminal devices needed to be paged at the current PO or a subsequent PO in current PTW. The network node may further comprise a second determination module for determining, from multiple terminal devices needed to be paged in the current PTW, one or more target terminal devices to be paged at the current PO together with the reference terminal device, based at least on radio link qualities of the multiple terminal devices. The network node may further comprise a paging module for paging the one or more target terminal devices and the reference terminal device at the current PO, using link adaptation based on the reference terminal device.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
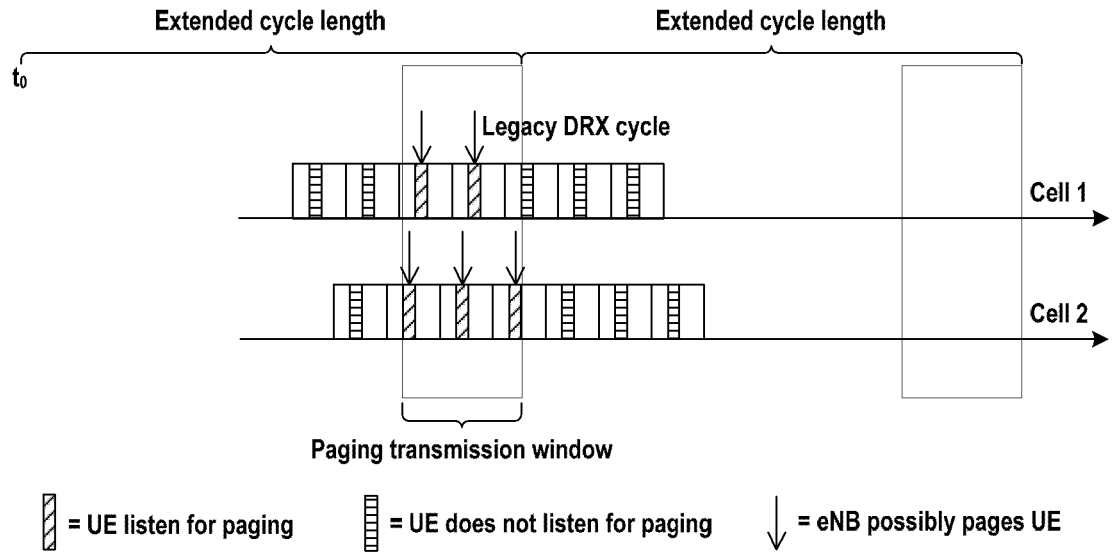
FIG. 1 is a diagram illustrating the working mechanism of eDRX.

The eDRX is a feature introduced in 3GPP release-13 (R-13) for NB-IoT. A UE configured with an eDRX cycle monitors the control channel for paging during a paging timing window (PTW) shown in FIG. 1 in a paging hyperframe (PH) based on a formula that is known by the mobility management entity (MME), UE and evolved node base station (eNB) as a function of the eDRX cycle and UE identity. During the PTW, the UE monitors paging for the duration of the PTW (as configured by non-access stratum (NAS)) or until a paging message is received for the UE, i.e. whichever is earlier. PH is determined through: H-SFN mod $T_{eDRX}$=(UE_ID mod $T_{eDRx}$), where UE_ID=IMSI mod 1024 and $T_{eDRX}$ is the eDRX cycle in hyper-frames. The term H-SFN refers to hyper system frame number. Within a PH, the PTW starting points are distributed across a number of starting points (4 starting points distributed according to UE_ID). Upper layers (NAS) are responsible for configuration of eDRX in idle mode.

The requirements in terms of reachability differs significantly between DRX and eDRX UEs. For DRX, a UE should be reached as soon as possible, whereas for eDRX, it is sufficient to reach it within the PTW.

In NB-IoT system, one cell is usually divided into 3 regions, CE0/CE1/CE2 each corresponding to different radio channel quality region, where CE refers to coverage enhancement. UEs within CE0 have the best radio link quality, UEs within CE1 have the medium radio link quality and UEs within CE2 have the worst radio link quality. For UEs in CE0, since they have good radio link quality, a message transmitted to them needs less repetition. For UEs in CE2, since they have worse radio link quality, a message transmitted to them needs more repetition.

Paging is a message that can be shared by multiple NB-IoT UEs. For those NB-IoT UEs whose PO is at the same downlink (DL) subframe, when more than one UEs need be paged, then one paging message is used to convey paging indicator for multiple NB-IoT UEs.

The problem with the existing solution is that when one paging message includes multiple UE paging indicators, and UEs both in CE0 and CE2 need be paged in the same PO, in order to let all UEs receive this paging message, the repetition for this paging message needs to be designed according to the UE with the worst radio link quality. This is ok for UEs in DRX as the requirement in terms of reachability is high. That is, the UE must be paged at the current PO and the eNB needs to deliver paging indicator to all UEs as soon as possible. However, for UEs in eDRX, this may result into resource waste, as eDRX UE is not so sensitive to paging delay.

The present disclosure proposes an improved solution for paging. The basic idea is to re-arrange the paging message for eDRX UEs according to UEs' radio link qualities and optionally the delay that the UEs can tolerate. For example, UEs with similar radio link quality and/or having PO overlapped with each other can be grouped together so that the required repetition number for the paging message is more suitable for all UEs to be paged. Then resource can be used in a more efficient manner.

The solution may be applied to a communication system including a terminal device and a network node such as a base station or any other node with similar functionality. The terminal device can communicate through a radio access communication link with the base station. The base station can provide radio access communication links to terminal devices that are within its communication service cell. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 2:
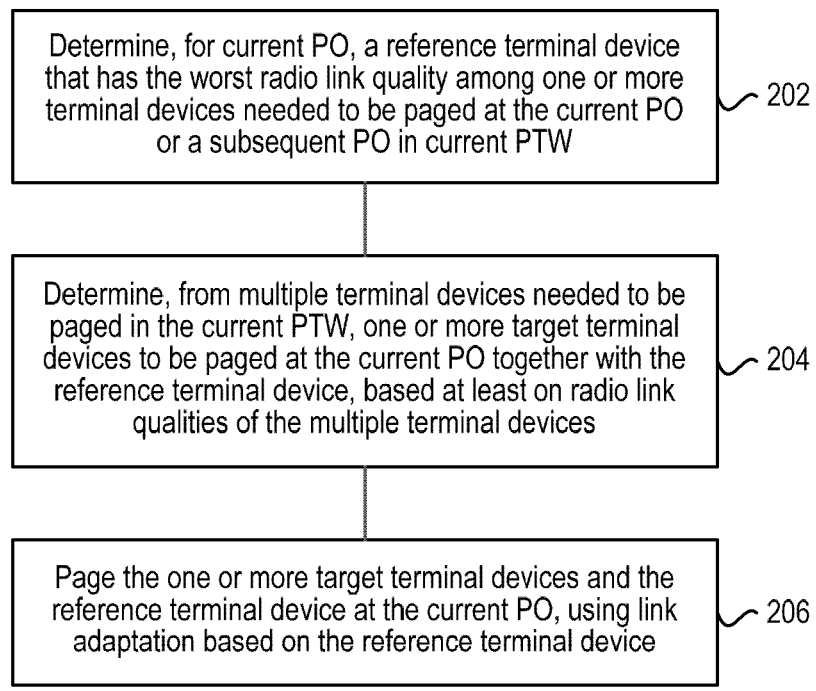
FIG. 2 is a flowchart illustrating a method implemented at a network node according to an embodiment of the disclosure.

Hereinafter, the solution will be described in detail with reference to FIGS. 2-11. FIG. 2 is a flowchart illustrating a method implemented at a network node according to an embodiment of the disclosure. The network node may be a base station or any other node with similar functionality. At block 202, the network node determines, for current PO, a reference terminal device that has the worst radio link quality among one or more terminal devices needed to be paged at the current PO or a subsequent PO in current PTW. Since the PTW is used, the one or more terminal devices may operate in, for example, eDRX mode. The one or more terminal devices may be determined as below. Firstly, the network node may determine whether there are terminal device(s) for which the last PO is the current PO. If there are such terminal device(s), they may be determined as the one or more terminal devices. If there are no such terminal device(s), the network node may determine whether there are terminal device(s) for which the last PO is the next PO. Likewise, if there are such terminal device(s), they may be determined as the one or more terminal devices. If there are no such terminal device(s), the network node may determine whether there are terminal device(s) for which the last PO is the PO immediately after the next PO. That is, the one or more terminal devices may refer to terminal device(s) needed to be paged earliest in the current PTW. The term "subsequent PO" may refer to the current PO, or the next PO, or the PO immediately after the next PO, or the like.

As an exemplary example, the radio link quality of a terminal device may be represented by a CE level of the terminal device, which may be determined by the network node when the terminal device is attached to the network. For this example, the terminal device with the highest CE level may be determined as the reference terminal device. Note that any other suitable metric indicating radio link quality may also be used instead.

At block 204, the network node determines, from multiple terminal devices needed to be paged in the current PTW, one or more target terminal devices to be paged at the current PO together with the reference terminal device, based at least on radio link qualities of the multiple terminal devices. Since the PTW is used, the multiple terminal devices may operate in, for example, eDRX mode. For example, if there exists at least one fourth terminal device for which a last PO is the current PO, the determined one or more target terminal devices may include the at least one fourth terminal device and at least one first terminal device that has a similar radio link quality as the reference terminal device. As an example, terminal devices having the same radio link quality (e.g. in the same CE level) may be considered as having similar radio link qualities. As another example, if the absolute value of a difference between radio link qualities of a terminal device and the reference terminal device is smaller than or equal to a predetermined threshold, such terminal device may be determined to have a similar radio link quality as the reference terminal device. If there does not exist the at least one fourth terminal device, the determined one or more target terminal devices may include the at least one first terminal device.

Optionally, the one or more target terminal devices may be determined based on the radio link qualities and last POs of the multiple terminal devices. For example, if there exists the at least one fourth terminal device, the determined one or more target terminal devices may include the at least one fourth terminal device and at least one second terminal device satisfying the following conditions: 1) the radio link quality of the at least one second terminal device is better than the reference terminal device; 2) the last PO for the at least one second terminal device is the next PO; and 3) the next PO is also the last PO of a third terminal device having a similar or worse radio link quality than the reference terminal device. If there does not exist the at least one fourth terminal device, the determined one or more target terminal devices may include the at least one second terminal device.

As another example, if there exists the at least one fourth terminal device, the determined one or more target terminal devices may include the at least one fourth terminal device, the at least one first terminal device and the at least one second terminal device. If there does not exist the at least one fourth terminal device, the determined one or more target terminal devices may include the at least one first terminal device and the at least one second terminal device.

At block 206, the network node pages the one or more target terminal devices and the reference terminal device at the current PO, using link adaptation based on the reference terminal device. With the method of FIG. 2, since the one or more target terminal devices are determined based at least on radio link qualities of the multiple terminal devices and paged together with the reference terminal device, the repetition number of the paging message required for paging can be reduced to save the resource for paging.

The method of FIG. 2 may be proposed in consideration of the following. As mentioned above, eDRX UE is not delay sensitive. The paging message for eDRX UE is transmitted in a PTW, that is, any PO within this PTW is suitable for paging eDRX UE. The base station (e.g. eNB) has the flexibility to page a UE in any PO in a PTW since the UE monitors on all the POs within a PTW. Therefore, at each PO, the base station could either page a UE or postpone paging this UE into its next PO but still within its PTW. This depends on whether paging resource allocation can be saved if the UE is paged in this PO or in next PO. This is related to the other UEs needed be paged in this PO.

Figure 3:
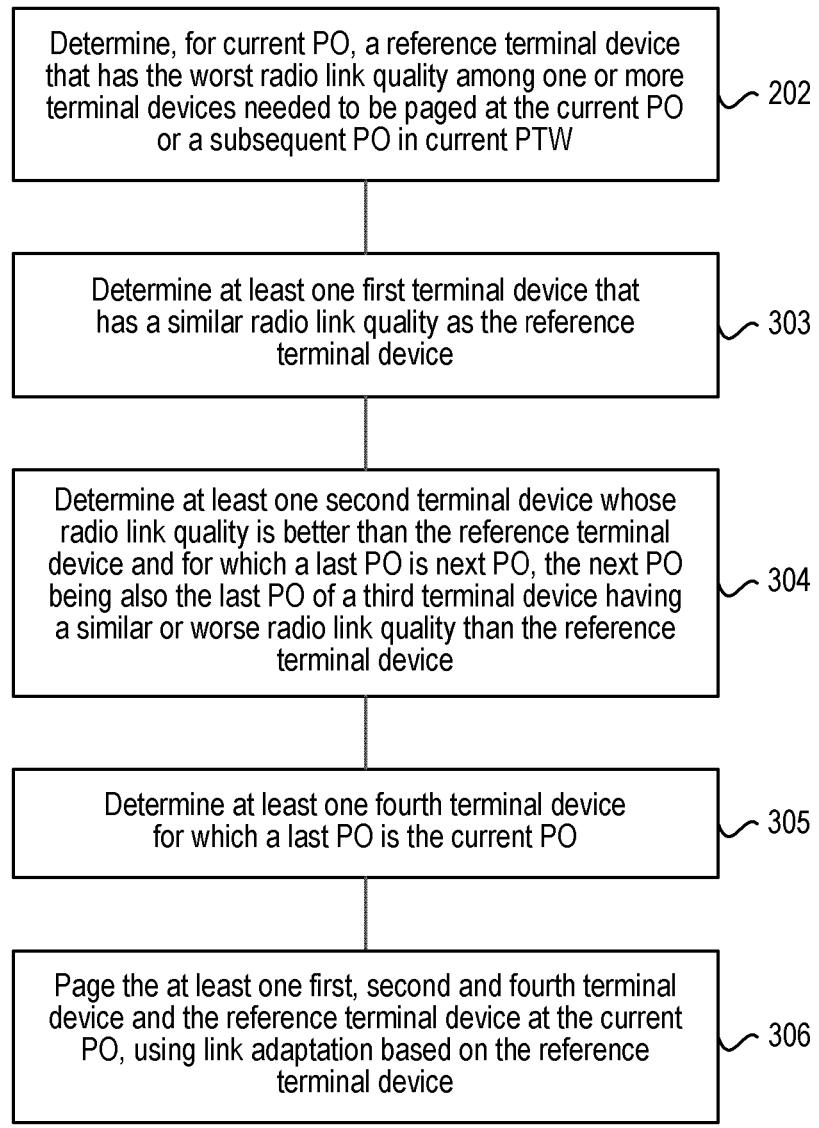
FIG. 3 is a flowchart illustrating a method implemented at a network node according to another embodiment of the disclosure.

FIG. 3 is a flowchart illustrating a method implemented at a network node according to another embodiment of the disclosure. As shown, the method comprises blocks 202 and 303-306. Block 202 has been described above and its details are omitted here for brevity. At block 303, the network node determines at least one first terminal device that has a similar radio link quality as the reference terminal device. At block 304, the network node determines at least one second terminal device whose radio link quality is better than the reference terminal device and for which a last PO is next PO. The next PO is also the last PO of a third terminal device having a similar or worse radio link quality than the reference terminal device. At block 305, the network node determines at least one fourth terminal device for which a last PO is the current PO. At block 306, the network node pages the at least one first, second and fourth terminal device and the reference terminal device at the current PO, using link adaptation based on the reference terminal device. It should be also noted that two blocks shown in succession in the figures may, in fact, be executed substantially concurrently, or the blocks may sometimes be executed in the reverse order, depending upon the functionality involved.

As an exemplar example, in the case that the network node is an eNB, at each PO, the eNB may first try to find a reference UE. The reference UE is the UE that needs to be paged in the earliest PO and has the worst radio link quality. This means if there are UEs whose last PO is the current PO, the reference UE is found from those UEs. If there are no UEs whose last PO is the current PO, then the reference UE is found from those UEs whose last PO is in the next PO, and etc. With the reference UE selected, the eNB may select other candidate UE(s) to be paged together with this reference UE. These candidate UE(s) may include three types of UE(s): a) UE(s) that must be paged in the current PO; b) UE(s) that have similar radio link qualities as the reference UE; c) UE(s) that have better radio link qualities than the reference UE, the next PO is their last PO in their PTW, and the next PO is also the last PO of another UE who has similar or worse radio link quality than the reference UE. Then, all UEs in a), b) and c) may be paged together with the reference UE. The paging link adaptation or repetition number may be based on the reference UE.

For example, assume there are 7 UEs A, B, C, D, E, F, G in the system. The required repetition numbers for respective UEs are 1, 2, 4, 8, 16, 32, 64 respectively. A/B/C is in CE0, D/E is in CE1, and F/G is in CE2. The possible POs for them are shown in the table below. Suppose the current PO index is N. That is, PO N+1 is the last PO for UE A/C/E, PO N+2 is the last PO for UE D/G, PO N+3 is the last PO for UE B/F.

|        | User can be paged | User selected to page |
|--------|-------------------|-----------------------|
| PO N   | A/B/C/D/E/F/G     | D/E                   |
| PO N + 1 | A/B/C/D/E/F/G   | A/B/C                 |
| PO N + 2 | B/D/F/G         | F/G                   |
| PO N + 3 | B/F             |                       |

Then at PO N, the reference UE is UE E. UE D has similar radio link quality with UE E. There is no UE who must be paged at PO N. There is no UE who must be paged at PO N+1, has a better radio link quality than UE E and needs to be paged together with UE who has worse radio link quality than UE E. Therefore at PO N, the paged UEs are UE D/E.

At PO N+1, the reference UE is UE C. UE A must be paged at PO N+1. UE B has similar radio link quality as UE C. There is no UE whose radio link quality is better than UE C, PO N+2 is its last PO, and PO N+2 is the last PO of a UE with worse radio link quality than UE C. Therefore at PO N+1, the paged UEs are UE A/B/C.

At PO N+2, the reference UE is UE G. UE F has similar radio quality as UE G. There are no other UEs left. Then at PO N+2, the paged UEs are UE F/G. The resource needed to page all UEs using legacy solution, i.e. one paging message includes all UEs, can be calculated as 64*7=448 repetitions of paging message. In contrast, the resource needed to page all UEs using the solution of the present disclosure is 16*2+4*3+64*2=172 repetitions of paging message. This shows that the solution of the present disclosure can save the resource quite a lot compared to the legacy solution.

Figure 4:
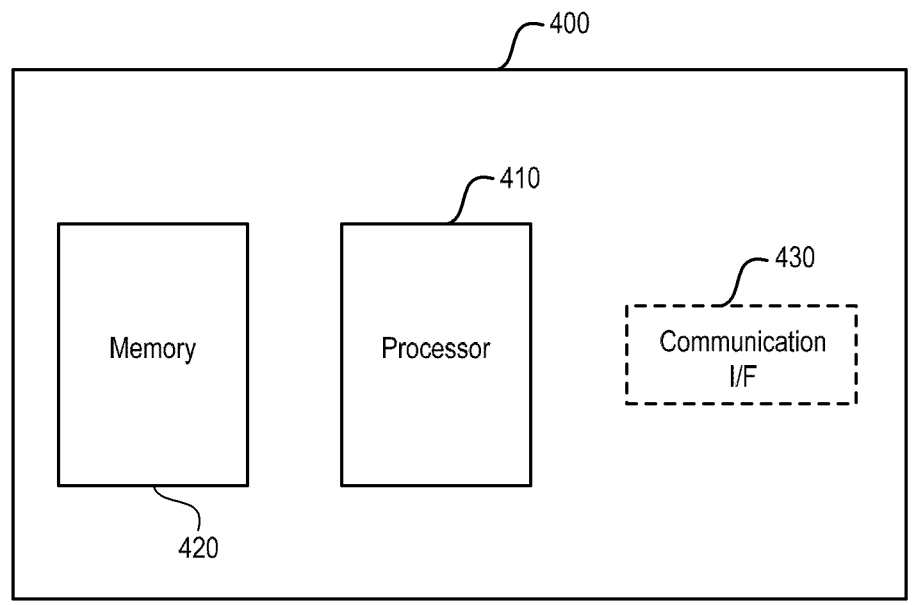
FIG. 4 is a block diagram showing an apparatus suitable for use in practicing some embodiments of the disclosure.

FIG. 4 is a block diagram showing an apparatus suitable for use in practicing some embodiments of the disclosure. For example, the network node described above may be implemented through the apparatus 400. As shown, the apparatus 400 may include a processor 410, a memory 420 that stores a program, and optionally a communication interface 430 for communicating data with other external devices through wired and/or wireless communication.

The program includes program instructions that, when executed by the processor 410, enable the apparatus 400 to operate in accordance with the embodiments of the present disclosure, as discussed above. That is, the embodiments of the present disclosure may be implemented at least in part by computer software executable by the processor 410, or by hardware, or by a combination of software and hardware.

The memory 420 may be of any type suitable to the local technical environment and may be implemented using any suitable data storage technology, such as semiconductor based memory devices, flash memories, magnetic memory devices and systems, optical memory devices and systems, fixed memories and removable memories. The processor 410 may be of any type suitable to the local technical environment, and may include one or more of general purpose computers, special purpose computers, microprocessors, digital signal processors (DSPs) and processors based on multi-core processor architectures, as non-limiting examples.

Figure 5:
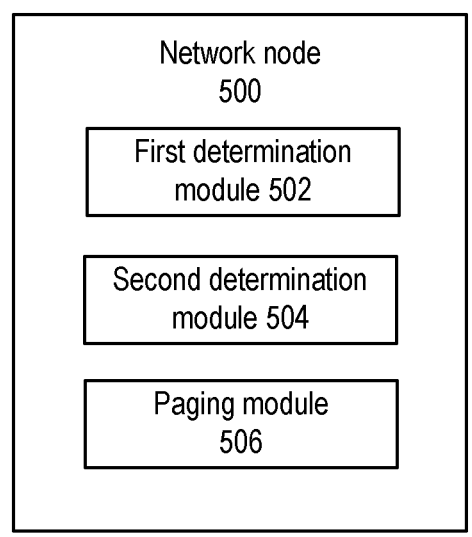
FIG. 5 is a block diagram showing a network node according to an embodiment of the disclosure.

FIG. 5 is a block diagram showing a network node according to an embodiment of the disclosure. As shown, the network node 500 comprises a first determination module 502, a second determination module 504 and a paging module 506. The first determination module 502 may be configured to determine, for current PO, a reference terminal device that has the worst radio link quality among one or more terminal devices needed to be paged at the current PO or a subsequent PO in current PTW, as described above with respect to block 202. The second determination module 504 may be configured to determine, from multiple terminal devices needed to be paged in the current PTW, one or more target terminal devices to be paged at the current PO together with the reference terminal device, based at least on radio link qualities of the multiple terminal devices, as described above with respect to block 204. The paging module 506 may be configured to page the one or more target terminal devices and the reference terminal device at the current PO, using link adaptation based on the reference terminal device, as described above with respect to block 206. The modules described above may be implemented by hardware, or software, or a combination of both.

Figure 6:
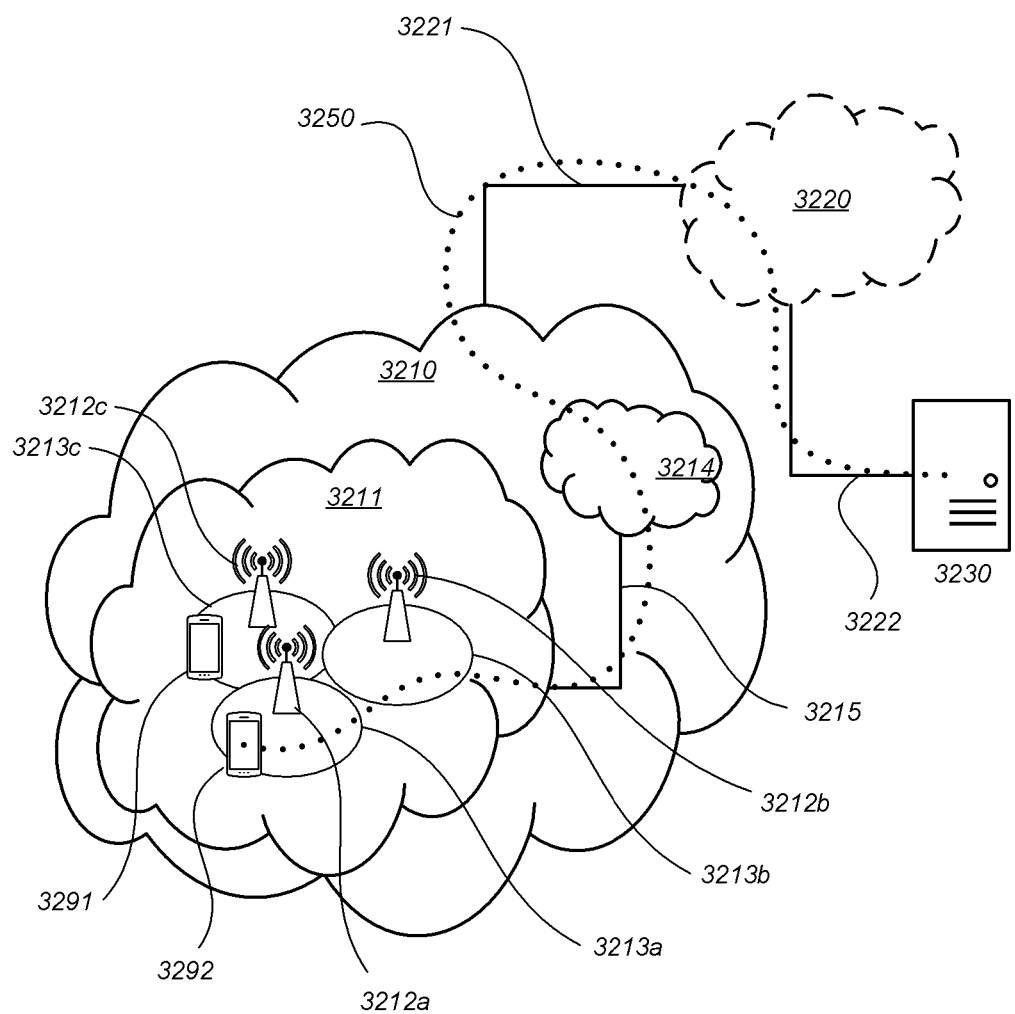
FIG. 6 is a diagram showing a telecommunication network connected via an intermediate network to a host computer in accordance with some embodiments.

With reference to FIG. 6, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 6 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 7) served by base station 3320. Communication interface 3326 may be configured to facilitate connection 3360 to host computer 3310. Connection 3360 may be direct or it may pass through a core network (not shown in FIG. 7) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 7:
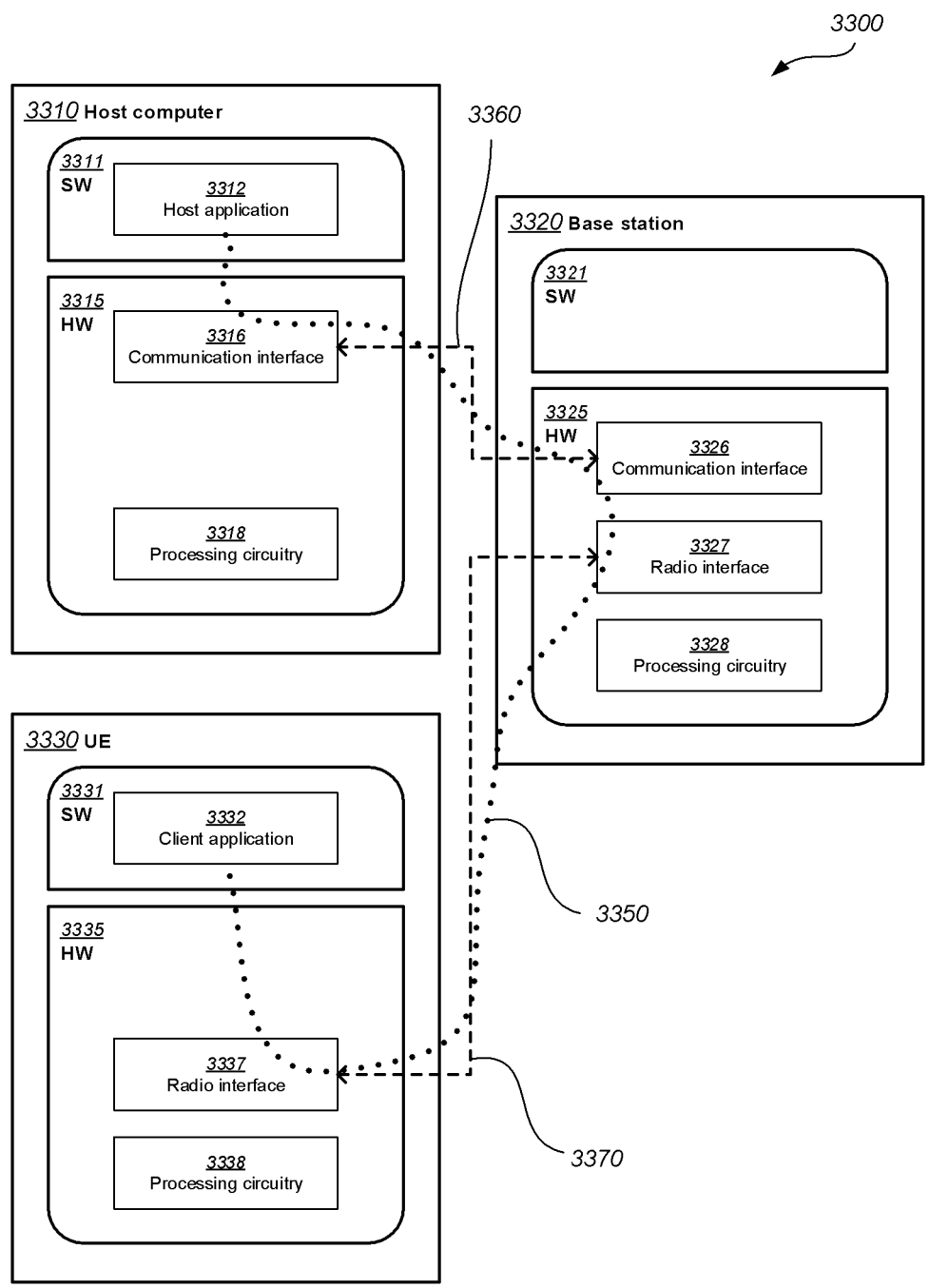
FIG. 7 is a diagram showing a host computer communicating via a base station with a user equipment in accordance with some embodiments.

It is noted that host computer 3310, base station 3320 and UE 3330 illustrated in FIG. 7 may be similar or identical to host computer 3230, one of base stations 3212*a*, 3212*b*, 3212*c* and one of UEs 3291, 3292 of FIG. 6, respectively. This is to say, the inner workings of these entities may be as shown in FIG. 7 and independently, the surrounding network topology may be that of FIG. 6.

In FIG. 7, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the resource saving and thereby provide benefits such as reduced resource required for paging.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 8:
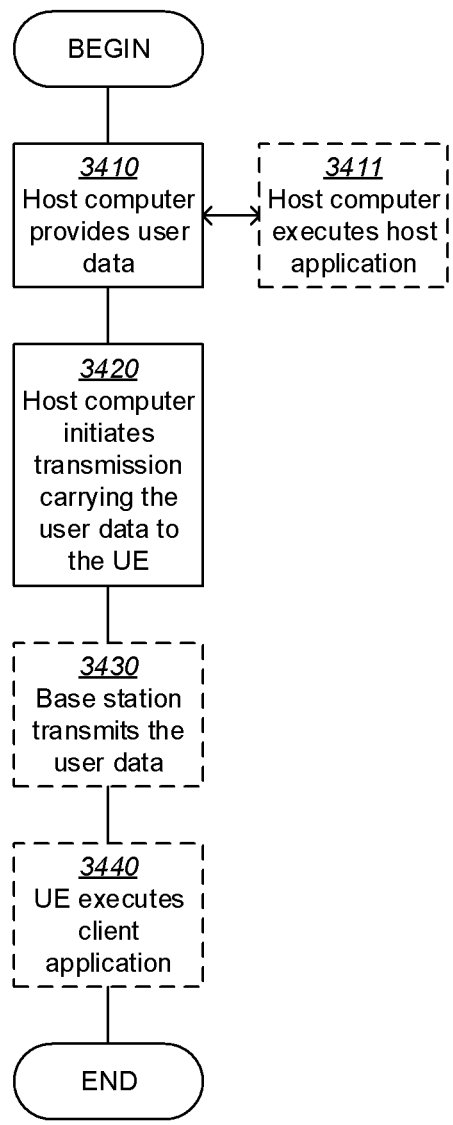
FIG. 8 is a flowchart illustrating a method implemented in a communication system in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 9:
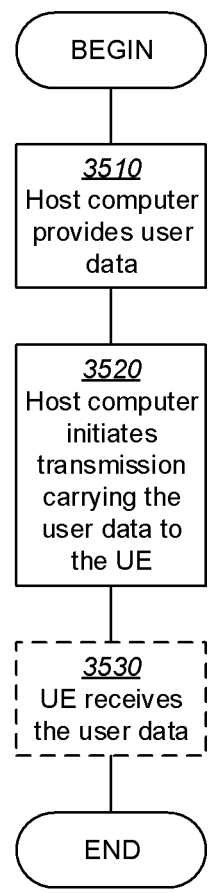
FIG. 9 is a flowchart illustrating a method implemented in a communication system in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the LIE receives the user data carried in the transmission.

Figure 10:
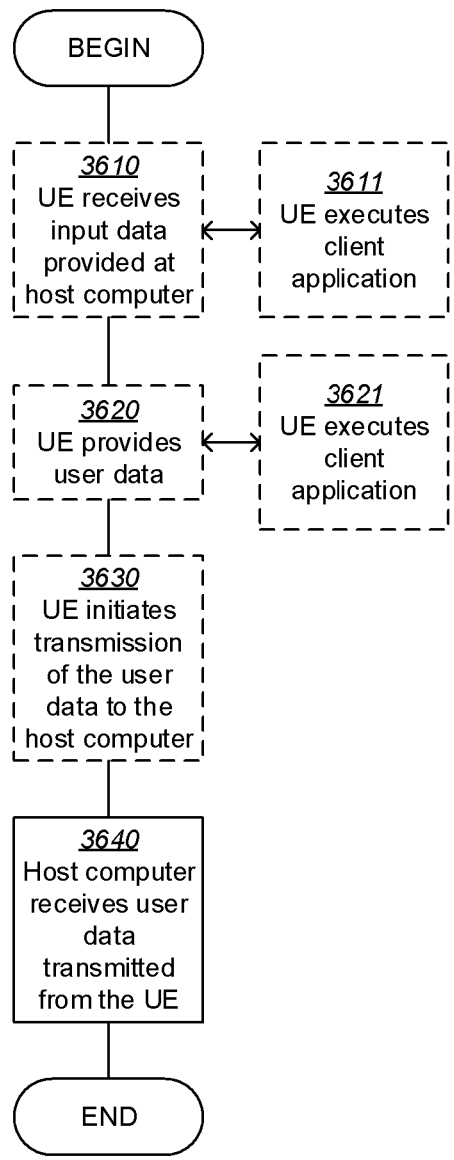
FIG. 10 is a flowchart illustrating a method implemented in a communication system in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 11:
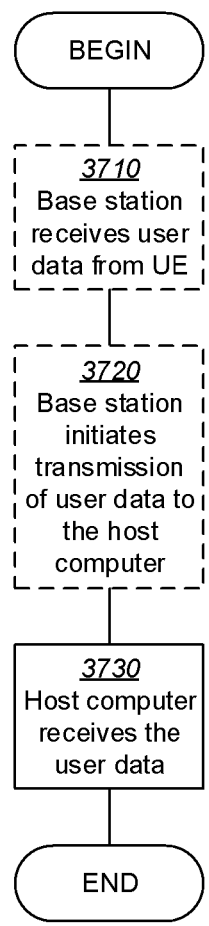
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine, for current PO, a reference terminal device that has the worst radio link quality among one or more terminal devices needed to be paged at the current PO or a subsequent PO in current PTW. The base station may determine, from multiple terminal devices needed to be paged in the current PTW, one or more target terminal devices to be paged at the current PO together with the reference terminal device, based at least on radio link qualities of the multiple terminal devices. The base station may page the one or more target terminal devices and the reference terminal device at the current PO, using link adaptation based on the reference terminal device.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to determine, for current PO, a reference terminal device that has the worst radio link quality among one or more terminal devices needed to be paged at the current PO or a subsequent PO in current PTW. The base station's processing circuitry may be further configured to determine, from multiple terminal devices needed to be paged in the current PTW, one or more target terminal devices to be paged at the current PO together with the reference terminal device, based at least on radio link qualities of the multiple terminal devices. The base station's processing circuitry may be further configured to page the one or more target terminal devices and the reference terminal device at the current PO, using link adaptation based on the reference terminal device.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a network node, the method comprising:
    determining, for current paging occasion (PO), a reference terminal device that has the worst radio link quality among one or more terminal devices needed to be paged at the current PO or a subsequent PO in current paging time window (PTW);
    determining, from multiple terminal devices needed to be paged in the current PTW, one or more target terminal devices to be paged at the current PO together with the reference terminal device, based at least on radio link qualities of the multiple terminal devices; and
    paging the one or more target terminal devices and the reference terminal device at the current PO, using link adaptation based on the reference terminal device, wherein the one or more target terminal devices are determined based further on last POs of the multiple terminal devices, and wherein the determined one or more target terminal devices comprise at least one fourth terminal device for which a last PO is the current PO.

2. The method according to claim 1, wherein the determined one or more target terminal devices comprise at least one first terminal device that has a similar radio link quality as the reference terminal device.

3. The method according to claim 1, wherein the determined one or more target terminal devices comprise at least one second terminal device whose radio link quality is better than the reference terminal device and for which a last PO is next PO, wherein the next PO is also the last PO of a third terminal device having a similar or worse radio link quality than the reference terminal device.

4. The method according to claim 1, wherein the radio link quality of a terminal device is represented by a coverage enhancement (CE) level of the terminal device.

5. The method according to claim 1, wherein the multiple terminal devices operate in extended discontinuous reception (eDRX) mode.

6. A network node comprising:
    at least one processor; and
    at least one memory, the at least one memory containing instructions executable by the at least one processor, whereby the network node is operative to:
        determine, for current paging occasion (PO), a reference terminal device that has the worst radio link quality among one or more terminal devices needed to be paged at the current PO or a subsequent PO in current paging time window (PTW);
        determine, from multiple terminal devices needed to be paged in the current PTW, one or more target terminal devices to be paged at the current PO together with the reference terminal device, based at least on radio link qualities of the multiple terminal devices; and
        page the one or more target terminal devices and the reference terminal device at the current PO, using link adaptation based on the reference terminal device, whereby the network node is further operative to determine the one or more target terminal devices based further on last POs of the multiple terminal devices, wherein the determined one or more target terminal devices comprise at least one fourth terminal device for which a last PO is the current PO.

7. The network node according to claim 6, wherein the determined one or more target terminal devices comprise at least one first terminal device that has a similar radio link quality as the reference terminal device.

8. The network node according to claim 6, wherein the determined one or more target terminal devices comprise at least one second terminal device whose radio link quality is better than the reference terminal device and for which a last PO is next PO, wherein the next PO is also the last PO of a third terminal device having a similar or worse radio link quality than the reference terminal device.

9. The network node according to claim 6, wherein the radio link quality of a terminal device is represented by a coverage enhancement (CE) level of the terminal device.

10. The network node according to claim 6, wherein the multiple terminal devices operate in extended discontinuous reception (eDRX) mode.

11. A non-transitory computer readable storage medium comprising instructions which when executed by at least one processor, cause the at least one processor to:
- determine, for current paging occasion (PO), a reference terminal device that has the worst radio link quality among one or more terminal devices needed to be paged at the current PO or a subsequent PO in current paging time window (PTW);
- determine, from multiple terminal devices needed to be paged in the current PTW, one or more target terminal devices to be paged at the current PO together with the reference terminal device, based at least on radio link qualities of the multiple terminal devices; and
- page the one or more target terminal devices and the reference terminal device at the current PO, using link adaptation based on the reference terminal device, whereby a network node is operative to determine the one or more target terminal devices based further on last POs of the multiple terminal devices, wherein the determined one or more target terminal devices comprise at least one fourth terminal device for which a last PO is the current PO.

12. The non-transitory computer readable storage medium according to claim 11, wherein the determined one or more target terminal devices comprise at least one second terminal device whose radio link quality is better than the reference terminal device and for which a last PO is next PO, wherein the next PO is also the last PO of a third terminal device having a similar or worse radio link quality than the reference terminal device.

13. The non-transitory computer readable storage medium according to claim 11, wherein the determined one or more target terminal devices comprise at least one first terminal device that has a similar radio link quality as the reference terminal device.

14. The non-transitory computer readable storage medium according to claim 11, wherein the radio link quality of a terminal device is represented by a coverage enhancement (CE) level of the terminal device.

* * * * *